(12) United States Patent
Kim et al.

(10) Patent No.: US 12,208,466 B2
(45) Date of Patent: Jan. 28, 2025

(54) LASER IRRADIATION APPARATUS

(71) Applicant: Samsung Display Co., Ltd., Yongin-si (KR)

(72) Inventors: Ji-Hwan Kim, Hwaseong-si (KR); Byung Soo So, Yongin-si (KR); Jonghoon Choi, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 869 days.

(21) Appl. No.: 17/314,559

(22) Filed: May 7, 2021

(65) Prior Publication Data

US 2022/0063015 A1   Mar. 3, 2022

(30) Foreign Application Priority Data

Aug. 31, 2020 (KR) ........................ 10-2020-0109889

(51) Int. Cl.
  *B23K 26/064* (2014.01)
  *B23K 26/00* (2014.01)
  *B23K 101/40* (2006.01)

(52) U.S. Cl.
  CPC ........ *B23K 26/064* (2015.10); *B23K 26/0006* (2013.01); *B23K 2101/40* (2018.08)

(58) Field of Classification Search
  CPC ............. B23K 26/032; B23K 26/0604; B23K 26/066; B23K 26/067; B23K 26/0608; B23K 26/0738; B23K 26/705; B23K 2103/56; B23K 26/064; B23K 26/0648; B23K 26/0665; B23K 26/0732; B23K 2103/50; B23K 26/0006; B23K 26/082; B23K 26/38; B23K 26/53; B23K 2101/36; B23K 2101/40; B23K 2103/05; B23K 2103/18; B23K 2103/42; B23K 26/00; B23K 26/03; B23K 26/035; B23K 26/04;

(Continued)

(56) References Cited

U.S. PATENT DOCUMENTS 5,847,400 A * 12/1998 Kain .................. G02B 21/0076
                                                            250/461.1
7,864,429 B2    1/2011  Muenz et al.
(Continued)

FOREIGN PATENT DOCUMENTS

JP        5447909       3/2014
JP        2020-114605   7/2020
(Continued)

*Primary Examiner* — Chris Q Liu
(74) *Attorney, Agent, or Firm* — KILE PARK REED & HOUTTEMAN PLLC

(57) ABSTRACT

A laser irradiation apparatus includes a laser beam generator that generates a first laser beam, a beam expander that expands the first laser beam and outputs the expanded first laser beam as a second laser beam, a beam splitter that splits the second laser beam into third laser beams and outputs the third laser beams, and a beam condenser that condenses the third laser beams and outputs condensed third laser beams. The beam expander includes a first lens having a first focal length and a second lens having a second focal length. The first lens is disposed between the laser beam generator and the second lens, the second lens is disposed between the first lens and the beam splitter, and the laser beam generator is spaced apart from the first lens by the first focal length.

14 Claims, 13 Drawing Sheets

(58) Field of Classification Search
CPC .. B23K 26/042; B23K 26/043; B23K 26/046; B23K 26/0617; B23K 26/0624; B23K 26/0643; B23K 26/0652; B23K 26/0676; B23K 26/083; B23K 26/0853; B23K 26/0884; B23K 26/324; B23K 26/359; B23K 26/36; B23K 26/40; B23K 26/402; B23K 26/702
USPC .... 219/121.73, 121.6, 121.64, 121.65, 121.8
See application file for complete search history.

(56) References Cited

U.S. PATENT DOCUMENTS

| | | | |
|---|---|---|---|
| 8,395,084 | B2 | 3/2013 | Tanaka |
| 2004/0120050 | A1* | 6/2004 | Tsukihara .......... B23K 26/0608 359/629 |
| 2009/0242523 | A1* | 10/2009 | Nakamae .......... B23K 26/0604 219/121.64 |
| 2010/0271704 | A1 | 10/2010 | Patzel et al. |
| 2012/0012758 | A1* | 1/2012 | Kajikawa ............... B23K 26/53 250/492.1 |

FOREIGN PATENT DOCUMENTS

| | | |
|---|---|---|
| KR | 10-2007-0090246 | 9/2007 |
| KR | 10-1284201 | 7/2013 |
| KR | 10-2016-0146412 | 12/2016 |
| KR | 10-2018-0051690 | 5/2018 |

* cited by examiner

LASER IRRADIATION APPARATUS

CROSS-REFERENCE TO RELATED APPLICATION(S)

This application claims priority to and benefits of Korean Patent Application No. 10-2020-0109889 under 35 U.S.C. § 119, filed on Aug. 31, 2020 in the Korean Intellectual Property Office, the entire contents of which are incorporated herein by reference.

BACKGROUND

1. Technical Field

The disclosure relates to a laser irradiation apparatus irradiating a uniform laser beam.

2. Description of the Related Art

Electronic devices that provide an image to a user, such as a smartphone, a digital camera, a notebook computer, a navigation unit, and a smart television, include a display device to display the image. The display device generates the image and displays the image to the user through a display screen thereof.

The display device may include a display panel including a plurality of pixels to generate the image and a driver to drive the display panel. Each pixel may include a transistor and a light emitting element electrically connected to the transistor. The transistor may include a source electrode, a drain electrode, a gate electrode, and a semiconductor layer.

For the improvement in electrical characteristics of the transistor, the semiconductor layer may be formed using polycrystalline silicon obtained by crystallizing amorphous silicon. A crystallizing process that irradiates a laser beam to the amorphous silicon may be required to form the polysilicon.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

The disclosure provides a laser irradiation apparatus capable of providing a laser beam having a corrected width to a beam splitter regardless of a direction to which the laser beam output from a laser beam generator travels.

Embodiments provide a laser irradiation apparatus that may include a laser beam generator that generates a first laser beam; a beam expander that expands the first laser beam and outputs the expanded first laser beam as a second laser beam; a beam splitter that splits the second laser beam into third laser beams and outputs the third laser beams; and a beam condenser that condenses the third laser beams and outputs condensed third laser beams. The beam expander may include a first lens having a first focal length and a second lens having a second focal length. The first lens may be disposed between the laser beam generator and the second lens, the second lens may be disposed between the first lens and the beam splitter, and the laser beam generator may be spaced apart from the first lens by the first focal length.

The beam splitter may be spaced apart from the second lens by the second focal length.

The first laser beam may be incident upon the second lens through the first lens, expanded by the first lens and the second lens, and output by the second lens as the second laser beam.

The laser beam generator, the beam expander, the beam splitter, and the beam condenser are disposed along an X-axis direction substantially parallel to an optical axis of the first lens and the second lens.

The second focal length of the second lens may be greater than the first focal length of the first lens in the X-axis direction.

The second laser beam may have a width greater than a width of the first laser beam in a Y-axis direction substantially perpendicular to the X-axis direction.

The second lens may have a width greater than a width of the first lens in the Y-axis direction.

A distance between the first lens and the second lens is set by a value obtained by adding the first focal length, the second focal length, and a first distance in the X-axis direction.

The first distance is equal to or greater than about zero.

The first distance is set based on an emission angle at which the first laser beam output from the laser beam generator is emitted with respect to the X-axis direction.

The first distance may increase as the emission angle increases.

The first lens may include a first surface facing the laser beam generator; and a second surface facing the second lens. The second lens may include a third surface facing the second surface of the first lens; and a fourth surface facing the beam splitter. One of the first surface and the second surface may include a substantially flat surface or a substantially curved surface, and the other of the first surface and the second surface may include the substantially curved surface. One of the third surface and the fourth surface may include a substantially flat surface or a substantially curved surface, and the other of the third surface and the fourth surface may include the substantially curved surface.

The beam splitter may include a plurality of third lenses facing the second lens; and a plurality of fourth lenses disposed between the plurality of third lenses and the beam condenser. The plurality of third lenses may include fifth surfaces facing the second lens; and a sixth surface facing the plurality of fourth lenses. The plurality of fourth lenses may include a seventh surface facing the plurality of third lenses; and eighth surfaces facing the beam condenser. One of the sixth surface and the fifth surfaces may include a substantially flat surface or a substantially curved surface, the other of the sixth surface and the fifth surfaces may include the substantially curved surface, one of the seventh surface and the eighth surfaces may include a substantially flat surface or a substantially curved surface, and the other of the seventh surface and the eighth surfaces may include the substantially curved surface.

The beam condenser may include a ninth surface facing the plurality of fourth lenses and a tenth surface opposite to the ninth surface, one of the ninth surface and the tenth surface may include a substantially flat surface or a substantially curved surface, and the other of the ninth surface and the tenth surface may include the substantially curved surface.

The laser irradiation apparatus further may include a first dummy lens disposed between the second lens and the beam splitter, the first dummy lens having a third focal length, and a distance between the second lens and the first dummy lens may be set by a value obtained by adding the second focal length and the third focal length in the X-axis direction.

The laser irradiation apparatus further may include a second dummy lens disposed between the first dummy lens and the beam splitter, the second dummy lens having a fourth focal length, and a distance between the first dummy lens and the second dummy lens may be set by a value obtained by adding the third focal length and the fourth focal length in the X-axis direction.

The beam splitter may be spaced apart from the second dummy lens by the fourth focal length.

The first laser beam generated by the laser beam generator may be incident at a first angle with respect to an X-axis direction, the second laser beam may be incident to the beam splitter at a second angle with respect to the X-axis direction, and a relationship between the first angle and the second angle may be determined by the following Equation of FL1·θ1FL2·θ2, where FL1 denotes the first focal length of the first lens, θ1 denotes the first angle, FL2 denotes the second focal length, and θ2 denotes the second angle.

Embodiments provide a laser irradiation apparatus that may include a laser beam generator that generates a first laser beam; a beam expander that expands the first laser beam and outputs the expanded first laser beam as a second laser beam; a beam splitter that splits the second laser beam into third laser beams and outputs the third laser beams; and a beam condenser that condenses the third laser beams and outputs the condensed third laser beams. The beam expander may include a first lens having a first focal length; and a second lens having a second focal length greater than the first focal length of the first lens. The first lens may be disposed between the laser beam generator and the second lens, the second lens may be disposed between the first lens and the beam splitter, the laser beam generator may be spaced apart from the first lens by the first focal length, and the laser beam splitter may be spaced apart from the second lens by the second focal length.

According to the above, the laser beam having the corrected width is provided to or incident upon the beam splitter regardless of a dispersion of the laser beam output from the laser beam generator, and thus, the crystallization process of the substrate may be accurately performed.

BRIEF DESCRIPTION OF THE DRAWINGS

The above and other advantages of the disclosure will become readily apparent by reference to the following detailed description when considered in conjunction with the accompanying drawings wherein.

DETAILED DESCRIPTION OF THE EMBODIMENTS

Figure 1:
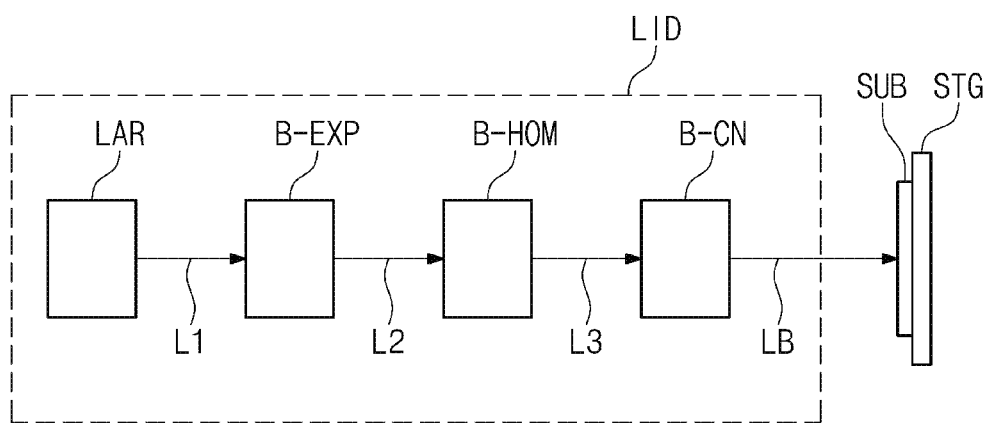
FIG. 1 is a schematic block diagram showing a laser irradiation apparatus according to an embodiment.

Features of the disclosure and methods of accomplishing the same may be understood more readily by reference to the following detailed description of embodiments and the accompanying drawings. The disclosure may, however, be embodied in many different forms and should not be construed as being limited to embodiments set forth herein. Rather, these embodiments are provided so that this disclosure will be through and complete and will fully convey the disclosure to those skilled in the art, and the disclosure will be defined by the appended claims. Like reference numerals denote like elements throughout the specification.

In the drawings, sizes, thicknesses, ratios, and dimensions of the elements may be exaggerated for ease of description and for clarity.

As used herein, the singular forms, "a," "an," and "the" are intended to include the plural forms as well, unless the context clearly indicates otherwise.

In the disclosure, it will be understood that when an element or layer is referred to as being "on", "connected to" or "coupled to" another element or layer, it can be directly on, connected or coupled to the other element or layer or intervening elements or layers may be present. As used herein, the term "and/or" includes any and all combinations of one or more of the associated listed items.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

Embodiments are described with reference to plan views and schematic cross-sectional views that are schematic diagrams. Accordingly, shapes of the views may vary depending on manufacturing technologies and/or tolerances. Thus, embodiments are not limited to the illustrated forms and also include variations in form produced according to manufacturing processes. Therefore, regions illustrated in the drawings are by way of example, and the shapes of the regions illustrated in the drawings are intended to illustrate shapes of the regions of elements and not to limit the scope of the disclosure.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the disclosure will be explained in detail with reference to the accompanying drawings.

FIG. 1 is a schematic block diagram showing a laser irradiation apparatus LID according to an embodiment.

Referring to FIG. 1, the laser irradiation apparatus LID according to an embodiment may irradiate a laser beam LB onto a substrate SUB disposed on a stage STG. Although not shown in FIG. 1, the laser irradiation apparatus LID, the stage STG, and the substrate SUB may be disposed in a process chamber. The process chamber may be, but is not limited to, a vacuum chamber or a positive pressure chamber. As an example, the laser beam LB may be formed using XeCl, XeF, Nd-YAG, or the like within the spirit and the scope of the disclosure. The laser beam LB may have peak wavelengths in a range of about 308 nm, about 351 nm, about 532 nm, respectively.

A semiconductor layer may be disposed on the substrate SUB. The semiconductor layer may include amorphous silicon. The laser beam LB may be irradiated onto the amorphous silicon of the semiconductor layer. The amorphous silicon may be crystallized by the laser beam LB to form polycrystalline silicon, and as a result, the semiconductor layer including the polycrystalline silicon may be formed. This process may be referred to as a crystallization process.

The laser irradiation apparatus LID may include a laser beam generator LAR, a beam expander B-EXP, a beam splitter B-HOM, and a beam condenser B-CN.

The beam expander B-EXP, the beam splitter B-HOM, and the beam condenser B-CN may include at least one lens. Lenses of the beam expander B-EXP, the beam splitter B-HOM, and the beam condenser B-CN will be described in detail with reference to FIG. 2.

Figure 2:
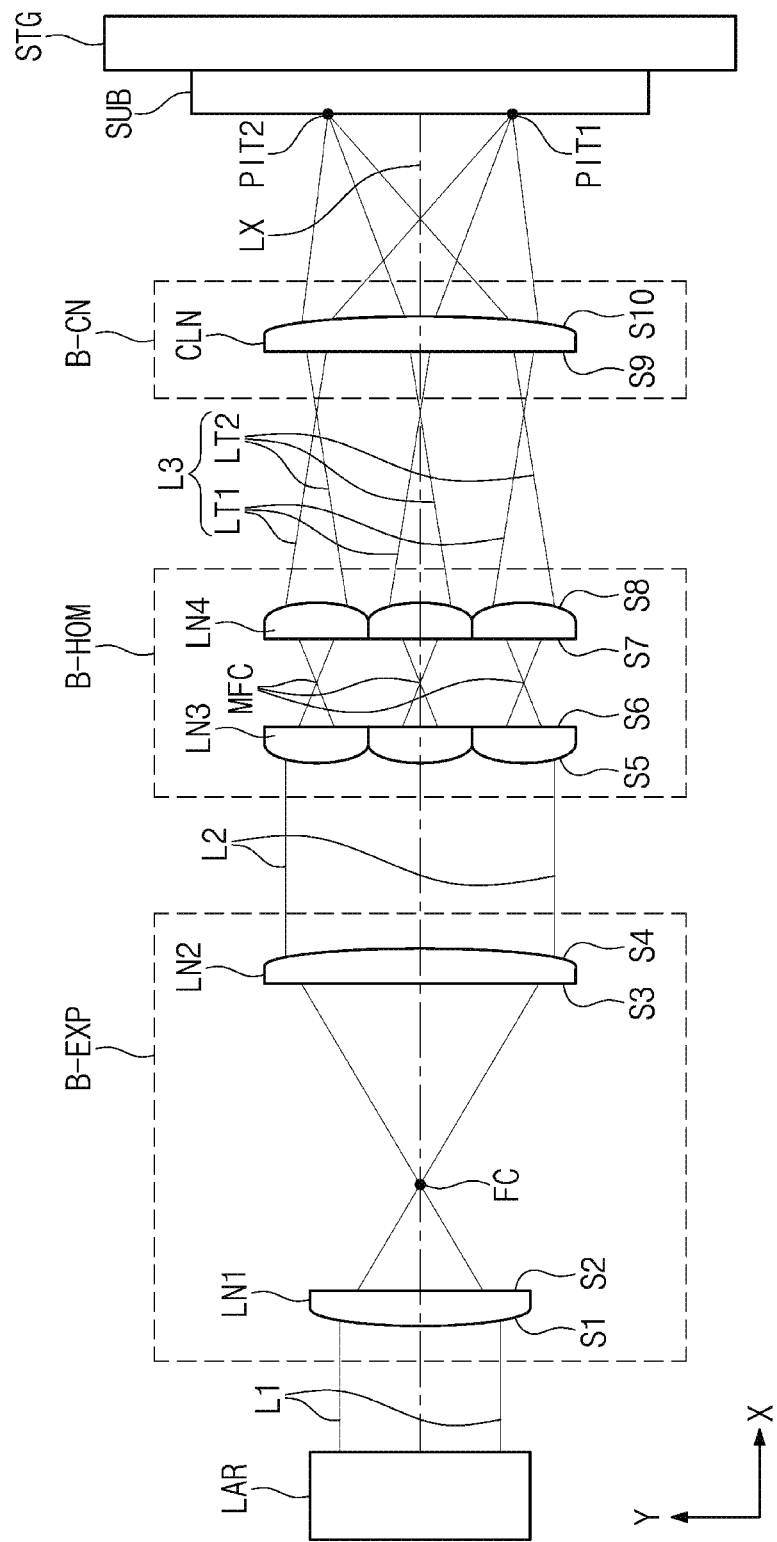
FIG. 2 is a view showing a configuration or arrangement of lenses of the laser irradiation apparatus shown in FIG. 1.

The laser beam generator LAR, the beam expander B-EXP, the beam splitter B-HOM, and the beam condenser B-CN may be arranged or disposed in an X-axis direction X. The X-axis direction X may be substantially parallel to an optical axis of the lenses of the beam expander B-EXP. The optical axis is shown in FIG. 2. Hereinafter, a direction crossing or intersecting the X-axis direction X to be perpendicular to the X-axis direction X is referred to as a Y-axis direction Y.

The beam expander B-EXP may be disposed between the laser beam generator LAR and the beam splitter B-HOM. The beam splitter B-HOM may be disposed between the beam expander B-EXP and the beam condenser B-CN. The beam condenser B-CN may be disposed between the beam splitter B-HOM and the stage STG. The substrate SUB may be disposed between the beam condenser B-CN and the stage STG.

As an example, the stage STG may be disposed at a right side of the beam condenser B-CN in the X-axis direction X, however, a position of the stage STG should not be limited thereto or thereby. For example, the stage STG may be disposed at a position lower than the beam condenser B-CN. A reflective member or the like may be disposed adjacent to the beam condenser B-CN to irradiate a light emitted from the beam condenser B-CN to the substrate SUB disposed on the stage STG.

The laser beam generator LAR may generate a first laser beam L1. The first laser beam L1 may be, but is not limited to, a linear laser beam. The first laser beam L1 may travel in the X-axis direction X, however, it should not be limited thereto or thereby. The first laser beam L1 may travel in a direction different from the X-axis direction X or may be dispersed. The first laser beam L1 may be provided to or incident upon the beam expander B-EXP.

The beam expander B-EXP may receive the first laser beam L1 from the laser beam generator LAR and may expand the first laser beam L1. However, the beam expander B-EXP should not be limited thereto or thereby. For example, the beam expander B-EXP may output the first laser beam L1. The beam expander B-EXP may contract the first laser beam L1.

The beam expander B-EXP may expand the first laser beam L1 and may output the expanded first laser beam L1 as a second laser beam L2. The second laser beam L2 may be provided to or incident upon the beam splitter B-HOM.

The beam splitter B-HOM may split the second laser beam L2 provided from the beam expander B-EXP. The beam splitter B-HOM may split the second laser beam L2 and may output a plurality of third laser beams L3. The third laser beams L3 may be provided to or incident upon the beam condenser B-CN. The beam splitter B-HOM may be referred to as a beam homogenizer.

The beam condenser B-CN may condense the third laser beams L3. The beam condenser B-CN may condense the third laser beams L3 and may provide the condensed third laser beams L3 to the substrate SUB as the laser beam LB.

FIG. 2 is a view showing a configuration or arrangement of the lenses of the laser irradiation apparatus of FIG. 1.

Referring to FIG. 2, the beam expander B-EXP may include a first lens LN1 and a second lens LN2. An optical axis LX of the first lens LN1 and the second lens LN2 may be defined in the laser irradiation apparatus LID. The laser beam generator LAR, the beam expander B-EXP, the beam splitter B-HOM, and the beam condenser B-CN may be arranged or disposed on the optical axis LX.

The first lens LN1 may include a first surface S1 facing the laser beam generator LAR and a second surface S2 facing the second lens LN2. The first surface S1 may be a convex surface toward the laser beam generator LAR, and the second surface S2 may be a flat surface substantially parallel to the Y-axis direction Y. For example, the first lens LN1 may be a convex lens. However, the first lens LN1 should not be limited thereto or thereby. For example, one or a surface of the first surface S1 and the second surface S2 of the first lens LN1 may be a substantially flat or a substantially curved surface, and the other or another surface of the first surface S1 and the second surface S2 may be a substantially curved surface.

The second lens LN2 may include a third surface S3 facing the second surface S2 and a fourth surface S4 facing the beam splitter B-HOM. The fourth surface S4 may be a convex surface toward the beam splitter B-HOM, and the third surface S3 may be a flat surface substantially parallel to the Y-axis direction Y. For example, the second lens LN2 may be a convex lens. However, the second lens LN2 should not be limited thereto or thereby. For example, one or a surface of the third surface S3 and the fourth surface S4 of the second lens LN2 may be a substantially flat or a substantially curved surface, and the other or another surface of the third surface S3 and the fourth surface S4 may be a substantially curved surface.

The second surface S2 and the third surface S3, which face each other, may be substantially flat surfaces substantially parallel to each other. The first surface S1 and the fourth surface S4, which face opposite directions to each other, may be convex surfaces protruded to opposite directions to each other.

The first lens LN1 may have a width smaller than a width of the second lens LN2 with respect to the Y-axis direction Y. For example, the second lens LN2 may be greater or larger than the first lens LN1.

The first laser beam L1 generated by the laser beam generator LAR may be provided to or incident upon the second lens LN2 through the first lens LN1. The first laser beam L1 may be expanded while passing through the first lens LN1 and the second lens LN2. In detail, the first laser beam L1 may be provided to or incident upon the first lens LN1 and may be condensed by the first lens LN1. The first laser beam L1 may be condensed at a focus FC between the first lens LN1 and the second lens LN2 and may be expanded or and then, may be expanded toward the second lens LN2.

A distance between the second lens LN2 and the focus FC may be greater than a distance between the first lens LN1 and the focus FC. The second lens LN2 may have a width greater than that of the first lens LN1 with respect to the Y-axis direction Y. A width of the first laser beam L1 provided to or incident upon the second lens LN2 may be expanded and may be output through the second lens LN2 as the second laser beam L2. Accordingly, the second laser beam L2 may have a width greater than the width of the first laser beam L1 with respect to the Y-axis direction.

The beam splitter B-HOM may include a plurality of third lenses LN3 facing the second lens LN2 and a plurality of fourth lenses LN4 disposed between the third lenses and the beam condenser B-CN. The third lenses LN3 may be disposed between the second lens LN2 and the fourth lenses LN4. The fourth lenses LN4 may be disposed between the third lenses LN3 and the beam condenser B-CN.

The third lenses LN3 may include fifth surfaces S5 facing the second lens LN2 and a sixth surface S6 facing the fourth lenses LN4. The fifth surfaces S5 may include a convex surface toward the fourth surface S4, and the sixth surface S6 may include a substantially flat surface substantially parallel to the Y-axis direction Y. For example, the third lenses LN3 may be defined as convex lenses. However, the third lenses LN3 should not be limited thereto or thereby. For example, one or a surface of the sixth surface S6 and the fifth surfaces S5 of the third lenses LN3 may be a substantially flat or a substantially curved surface, and the other or another surface of the sixth surface S6 and the fifth surfaces S5 may be a substantially curved surface.

The third lenses LN3 may have the same size or substantially the same size as each other. The third lenses LN3 may be arranged or disposed in the Y-axis direction Y. As an example, three third lenses LN3 are shown in FIG. 2, however, the number of the third lenses LN3 should not be limited thereto or thereby.

The fourth lenses LN4 may be disposed to correspond to the third lenses LN3 in a one-to-one correspondence in the X-axis direction X. The fourth lenses LN4 may be disposed to face the third lenses LN3 in the X-axis direction X, respectively.

The fourth lenses LN4 may include a seventh surface S7 facing the third lenses LN3 and eighth surfaces S8 facing the beam condenser B-CN. The seventh surface S7 may include a flat surface substantially parallel to the Y-axis direction Y, and the eighth surfaces S8 may include a convex surface toward the beam condenser B-CN. For example, the fourth lenses LN4 may be defined as convex lenses. However, the fourth lenses LN4 should not be limited thereto or thereby. For example, one or a surface of the seventh surface S7 and the eighth surfaces S8 of the fourth lenses LN4 may be a substantially flat or a substantially curved surface, and the other surface or another of the seventh surface S7 and the eighth surfaces S8 may be a substantially curved surface.

The fourth lenses LN4 may have the same size or substantially the same size as each other. The fourth lenses LN4 may be arranged or disposed in the Y-axis direction Y. As an example, three fourth lenses LN4 are shown in FIG. 2, however, the number of the fourth lenses LN4 should not be limited thereto or thereby.

The sixth surface S6 and the seventh surface S7, which face each other, may include substantially flat surfaces substantially parallel to each other. The fifth surfaces S5 and the eighth surfaces S8, which face opposite directions to each other, may include convex surfaces protruded to opposite directions to each other.

Each of the third and fourth lenses LN3 and LN4 may have a width smaller than the width of the second lens LN2 with respect to the Y-axis direction Y.

The second laser beam L2 output through the second lens LN2 may be split into a plurality of lights by the third lenses LN3. The lights may be condensed and expanded at focuses MFC between the third lenses LN3 and the fourth lenses LN4 and may be provided to or incident upon the fourth lenses LN4.

The lights may be provided to or incident upon the beam condenser B-CN through the fourth lenses LN4 as the third laser beams L3.

The beam condenser B-CN may include a condensing lens CLN. The condensing lens CLN may include a ninth surface S9 facing the fourth lenses LN4 and a tenth surface S10 facing the substrate SUB. The tenth surface S10 may be a surface opposite to the ninth surface S9 in the X-axis direction X.

The ninth surface S9 may be a substantially flat surface substantially parallel to the Y-axis direction Y, and the tenth surface S10 may be a convex surface toward the substrate SUB. For example, the condensing lens CLN may be defined as a convex lens. However, the condensing lens CLN should not be limited thereto or thereby. For example, one or a surface of the ninth surface S9 and the tenth surface S10 of the condensing lens CLN may be a flat or curved surface, and the other or another surface of the ninth surface S9 and the tenth surface S10 may be a substantially curved surface.

The third laser beams L3 output through the fourth lenses LN4 may be condensed by the condensing lens CLN and may be output as the laser beam LB.

The third laser beams L3 may include first lights LT1 traveling in the same direction as each other and second lights LT2 traveling in a direction different from that of the first lights LT1. The second lights LT2 may travel in the same direction as each other. The first lights LT1 may be condensed by the condensing lens CLN and may be provided to or incident upon a first point PIT1 of the substrate SUB. The second lights LT2 may be condensed by the condensing lens CLN and may be provided to or incident upon a second point PIT2 of the substrate SUB.

Figure 3:
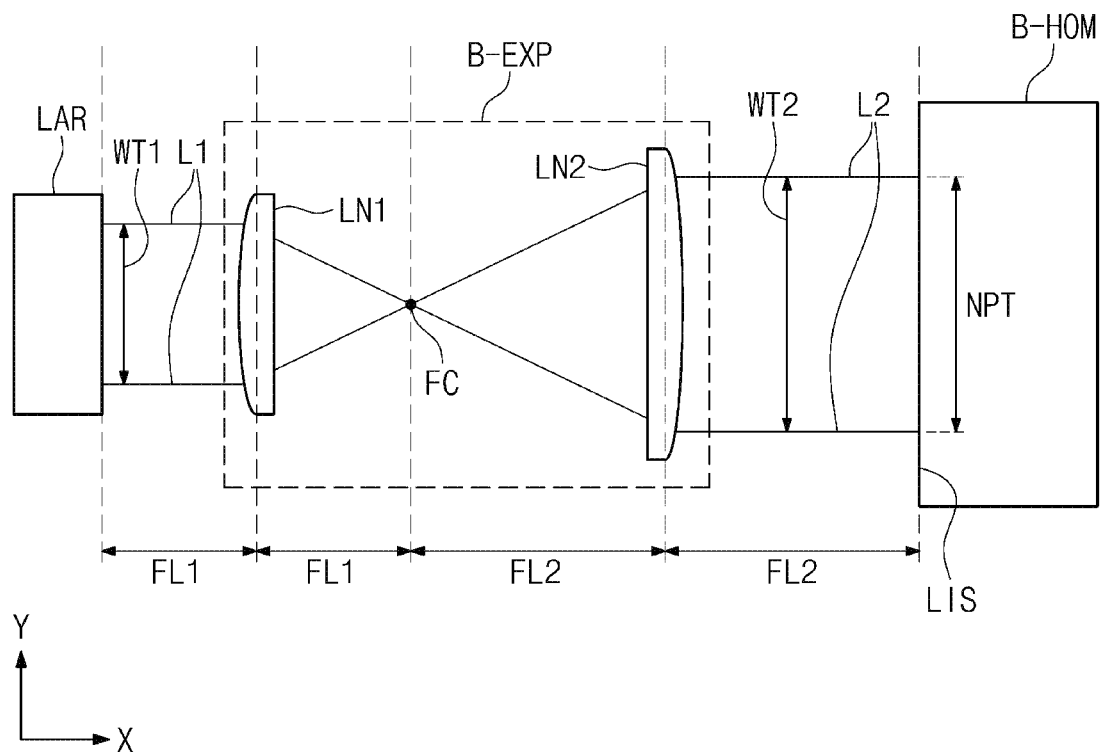
FIG. 3 is a view showing distances between a laser beam generator, a first lens, a second lens, and a light incident surface of a beam splitter shown in FIG. 2.

FIG. 3 is a view showing distances between the laser beam generator, the first lens, the second lens, and a light incident surface of the beam splitter shown in FIG. 2.

Referring to FIG. 3, the light incident surface LIS may be defined as a surface of the beam splitter B-HOM, which faces the second lens LN2.

The first lens LN1 may have a first focal length FL1. The second lens LN2 may have a second focal length FL2. The second focal length FL2 may be greater than the first focal length FL1.

The laser beam generator LAR may be spaced apart from the first lens LN1 by the first focal length FL1 in the X-axis direction X. The beam splitter B-HOM may be spaced apart from the second lens LN2 by the second focal length FL2 in the X-axis direction X. In detail, the light incident surface LIS of the beam splitter B-HOM may be spaced apart from the second lens LN2 by the second focal length FL2.

The first laser beam L1 may have a first width WT1 in the Y-axis direction Y and may travel in the X-axis direction X. The second laser beam L2 expanded by the beam expander B-EXP may have a second width WT2 greater than the first width WT1 in the Y-axis direction Y. The width of the second laser beam L2 may be set to a predetermined width to be irradiated to the substrate SUB (refer to FIG. 2).

A portion of the light incident surface LIS to which the second laser beam L2 is provided or incident upon may be defined as a normal irradiation portion NPT. In a case where the second laser beam L2 is irradiated to the normal irradiation portion NPT, the laser beam LB may be normally irradiated to the substrate SUB, and thus, the crystallization process may be properly performed. In a case where the second laser beam L2 is irradiated to a portion of the light incident surface LIS to partially deviate from the normal irradiation portion NPT, the laser beam LB (refer to FIG. 2) may not be normally irradiated to the substrate SUB (refer to FIG. 2).

The distance between the first lens LN1 and the second lens LN2 may be set to a distance to allow the second laser beam L2 to maintain the second width WT2. For example, in a case that the first laser beam L1 is a linear light traveling in the X-axis direction X, the distance between the first lens LN1 and the second lens LN2 may be set to a value obtained by adding the second focal length FL2 to the first focal length FL1 in the X-axis direction X. However, the first laser beam L1 may not be the linear light traveling in the X-axis direction X. The distance between the first lens LN1 and the second lens LN2 will be described with reference to FIG. 4.

Figure 4:
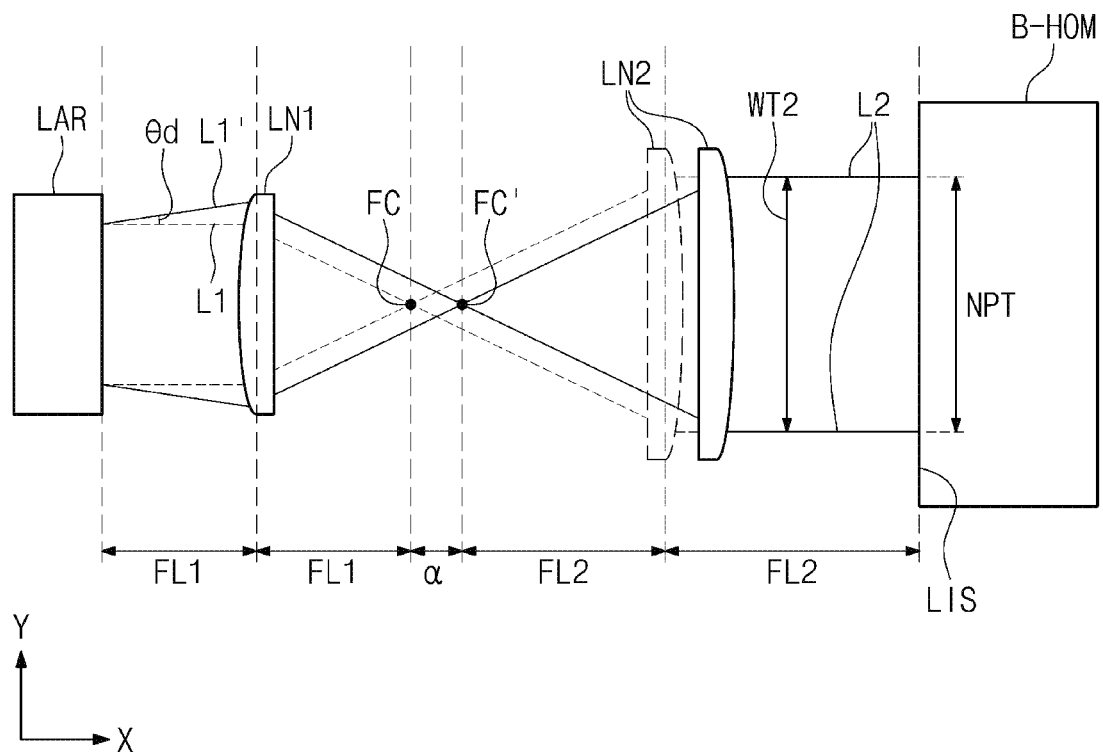
FIG. 4 is a view showing a distance between the first lens and the second lens when a first laser beam is emitted from a beam expander shown in FIG. 3.

FIG. 4 is a view showing a distance between the first lens and the second lens in a case that a first laser beam is emitted from the beam expander shown in FIG. 3.

As an example, the second lens LN2 shown in FIG. 3 is shown in FIG. 4 by a dotted line.

Referring to FIG. 4, a first laser beam L1' generated by the laser beam generator LAR may be emitted at and may travel in a first emission angle θd with respect to the X-axis direction X. For example, the first laser beam L1' may be emitted in a radial shape. For example, the first laser beam L1' may have a width that gradually increases as a distance from the first lens LN1 decreases.

The first laser beam L1' may be condensed by the first lens LN1. The condensed first laser beam L1' may be expanded after being condensed at a point spaced apart from the first focal length FL1 in the X-axis direction X by a first distance α. For example, the first laser beam L1' may be expanded after being condensed at a focus FC' that may be spaced apart from the focus FC by the first distance α.

The first distance α may correspond to a distance between the focus FC and the focus FC'. In FIG. 4, a position of the second lens LN2 may move to a right side by the first distance α compared with the second lens LN2 shown by a dotted line. A distance between the focus FC' and the second lens LN2 may be the second focal length FL2.

The first distance α may be defined or set based on the first emission angle θd at which the first laser beam L1' output from the laser beam generator LAR travels with respect to the X-axis direction X. In detail, the distance between the first lens LN1 and the second lens LN2 in the X-axis direction X may be set as a value obtained by adding the first focal length FL1, the second focal length FL2, and the first distance α.

In a case that the first distance α is about zero (0), the distance between the first lens LN1 and the second lens LN2 may be set as a value obtained by adding the first focal length FL1 and the second focal length FL2 as shown in FIG. 3. In a case that the first distance α is greater than about zero (0), the distance between the first lens LN1 and the second lens LN2 may increase by the first distance α. As the first emission angle θd at which the first laser beam L1' output from the laser beam generator LAR is emitted increases, the first distance α may increase.

The first laser beam L1' may be provided to or incident upon the second lens LN2. The first laser beam L1' output from the first lens LN1 may be refracted by the second lens LN2. The first laser beam L1' refracted by the second lens LN2 may travel in a direction substantially parallel to the X-axis direction X and may be provided to or incident upon the light incident surface LIS of the beam splitter B-HOM as the second laser beam L2. The second laser beam L2 may be provided to or incident upon the normal irradiation portion NPT.

In a case that the distance between the first lens LN1 and the second lens LN2 is set as the value obtained by adding the first focal length FL1, the second focal length FL2, and the first distance α, the second laser beam L2 provided to or incident upon the beam splitter through the second lens LN2 may be provided to or incident upon the normal irradiation portion NPT with a corrected second width WT2.

Figure 5:
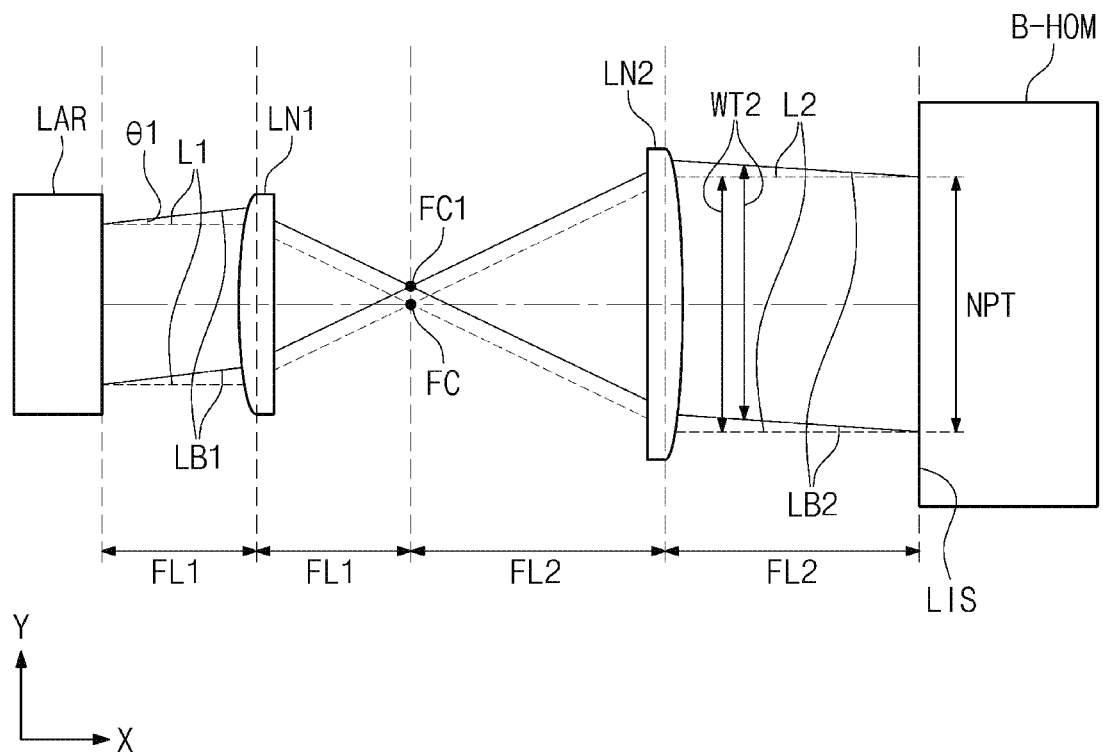
FIG. 5 is a view showing the first laser beam traveling at a predetermined angle with respect to an X-axis direction.

FIG. 5 is a view showing a first laser beam traveling at a predetermined angle with respect to the X-axis direction.

Referring to FIG. 5, the first laser beam LB1 generated by the laser beam generator LAR may travel in a direction different from that of the first laser beam L1 in the X-axis direction X. For example, an incident angle of the first laser beam LB1 may be different from an incident angle of the first laser beam L1. For example, the first laser beam LB1 may travel to form a first angle θ1 with the X-axis direction X. Although not shown in the figures, the first laser beam LB1 may travel to form the first angle θ1 with the Y-axis direction Y.

The first laser beam LB1 may be condensed by the first lens LN1. The condensed first laser beam LB1 may be expanded after being condensed between the first lens LN1 and the second lens LN2. The first laser beam LB1 may be expanded after being condensed at a first focus FC1 formed in a different position from that of the focus FC.

As the incident angle of the first laser beam LB1 increases, a distance between the focus FC at which the first laser beam L1 is condensed and the first focus FC1 at which the first laser beam LB1 is condensed may increase. The expanded first laser beam LB1 may be refracted by the second lens LN2. The first laser beam LB1 refracted by the second lens LN2 may be output to the second laser beam LB2.

The second laser beam LB2 provided from the second lens LN2 may have a second width WT2 with respect to the Y-axis direction Y and may be provided to or incident upon the light incident surface LIS of the beam splitter B-HOM. In a case where the laser beam generator LAR is spaced apart from the first lens LN1 by the first focal length FL1 and the second lens LN2 is spaced apart from the beam splitter B-HOM by the second focal length FL2, a position of the light incident surface LIS to which the second laser beam LB2 is provided or incident upon may be substantially the same as a position of the light incident surface LIS to which the second laser beam L2 shown in FIGS. 3 and 4 is provided or incident upon. For example, the second laser beam LB2 may be provided to or incident upon the normal irradiation portion NPT.

Hereinafter, the position of the light incident surface to which the second laser beam LB2 is provided or incident upon will be described in a case where the laser beam generator LAR is not spaced apart from the first lens LN1 by the first focal length FL1 and a case where the second lens LN2 is not spaced apart from the beam splitter B-HOM by the second focal length FL2. Since the operation of the beam expander B-EXP has been described in detail above, details thereof will be omitted or schematically described.

Figure 6:
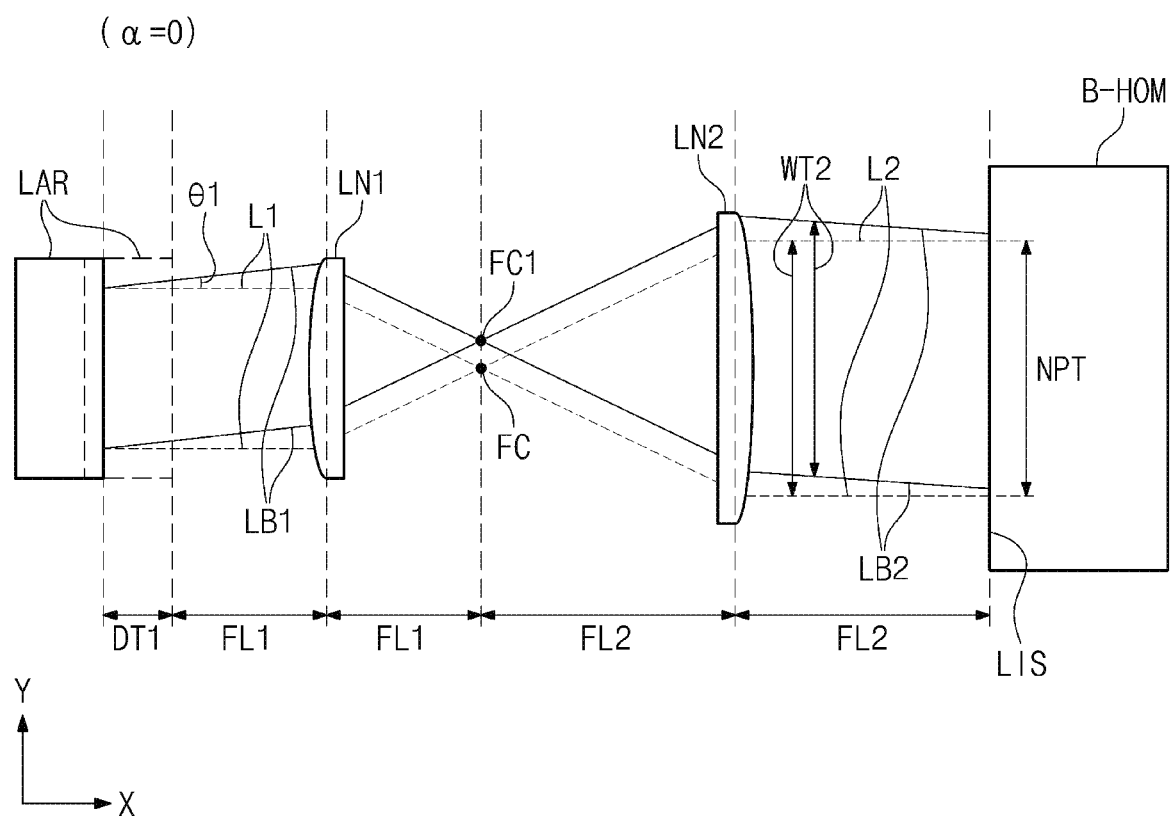
FIG. 6 is a view showing a direction in which first and second laser beams travel when a distance between a laser beam generator and a first lens shown in FIG. 5 is greater than a first focal length.

FIG. 6 is a view showing a direction in which the first and second laser beams travel in a case that the distance between the laser beam generator and the first lens shown in FIG. 5 is greater than the first focal length.

Referring to FIG. 6, the laser beam generator LAR may be spaced apart from the first lens LN1 by a distance greater than the first focal length FL1 in the X-axis direction X. For example, the laser beam generator LAR may be spaced apart from the first lens LN1 by the distance obtained by adding the first focal length FL1 and a first distance DT1. The first laser beam LB1 generated by the laser beam generator LAR may travel at the first angle θ1 with respect to the X-axis direction X.

Since the distance between the laser beam generator LAR and the first lens LN1 is greater than that shown in FIG. 5, the first laser beam LB1 may be provided or disposed to or incident upon a portion of the first lens LN1, which may be located or disposed higher than the portion shown in FIG. 5. The second laser beam LB2 expanded by the beam expander B-EXP may be provided to or incident upon a portion of the light incident surface LIS that may be located or disposed higher than the portion shown in FIG. 5. For example, in a case that the laser beam generator LAR is spaced apart from the first lens LN1 by the distance greater than the first focal length FL1 in the X-axis direction X, the second laser beam LB2 may be irradiated to or incident upon the light incident surface LIS to partially deviate from the normal irradiation portion NPT.

Figure 7:
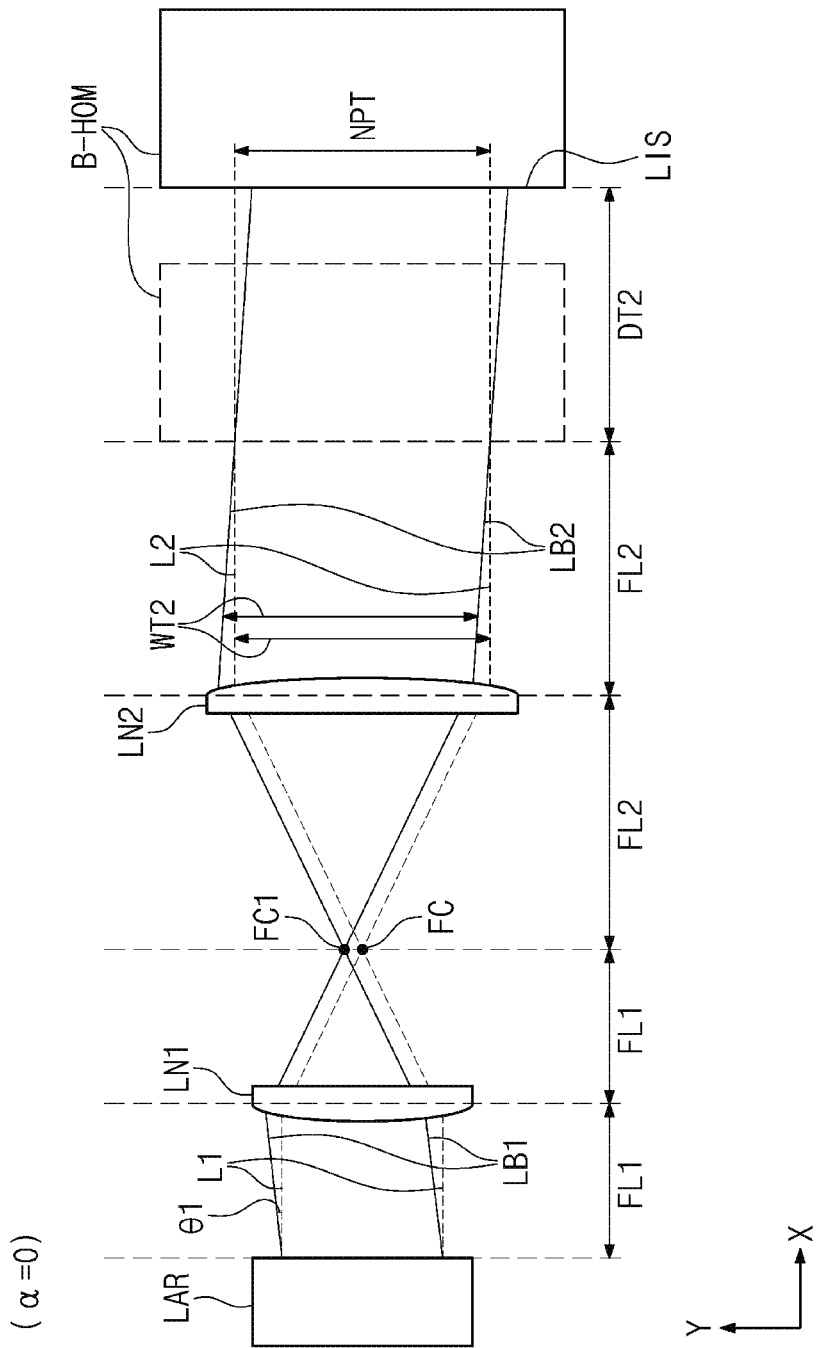
FIG. 7 is a view showing a direction in which first and second laser beams travel when a distance between a second lens and a light incident surface shown in FIG. 5 is greater than a second focal length.

FIG. 7 is a view showing a direction in which the first and second laser beams travel in a case that the distance between the second lens and the light incident surface shown in FIG. 5 is greater than the second focal length.

Referring to FIG. 7, the beam splitter B-HOM may be spaced apart from the second lens LN2 by a distance greater than the second focal length FL2 in the X-axis direction X. For example, the beam splitter B-HOM may be spaced apart from the second lens LN2 by the distance obtained by adding the second focal length FL2 and a second distance DT2. The first laser beam LB1 generated by the laser beam generator LAR may travel at the first angle θ1 with respect to the X-axis direction X.

Since the distance between the beam splitter B-HOM and the second lens LN2 is greater than that shown in FIG. 5, the second laser beam LB2 expanded by the beam expander B-EXP may be provided or disposed to or incident upon a portion of the light incident surface LIS, which may be located or disposed lower than the portion shown in FIG. 5. For example, in a case that the beam splitter B-HOM is spaced apart from the second lens LN2 by the distance greater than the second focal length FL2 in the X-axis direction X, the second laser beam LB2 may be irradiated to or incident upon the light incident surface LIS to partially deviate from the normal irradiation portion NPT.

Referring to FIG. 5 again, the laser beam generator LAR may be spaced apart from the first lens LN1 by the first focal length FL1, and the beam splitter B-HOM may be spaced apart from the second lens LN2 by the second focal length FL2. Accordingly, different from FIGS. 6 and 7, the second laser beam LB2 may be provided to or incident upon the normal irradiation portion NPT of the light incident surface LIS. Therefore, the laser beam LB (refer to FIG. 2) having the corrected width may be normally irradiated to the substrate SUB (refer to FIG. 2). As a result, the crystallization process of the substrate SUB (refer to FIG. 2) may be normally performed.

Figure 8A:
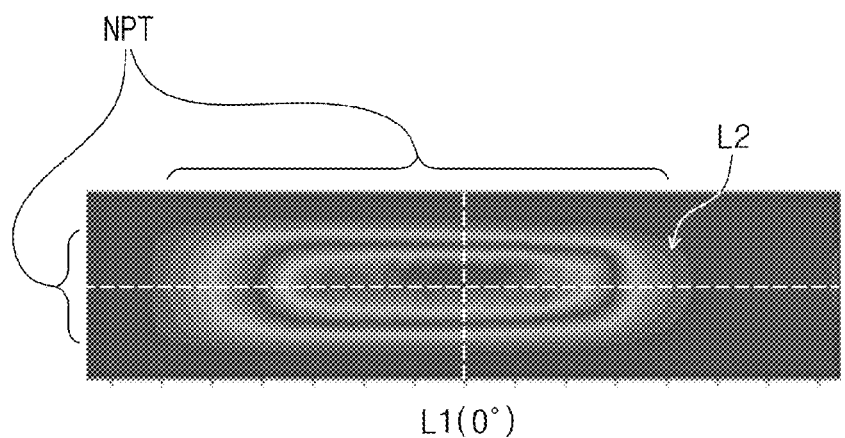
FIG. 8A is a view showing a test result of an irradiation area of a first laser beam generated by the laser beam generator shown in FIG. 3.

FIG. 8A is a view showing a test result of an irradiation area of the first laser beam generated by the laser beam generator shown in FIG. 3.

Figure 8B:
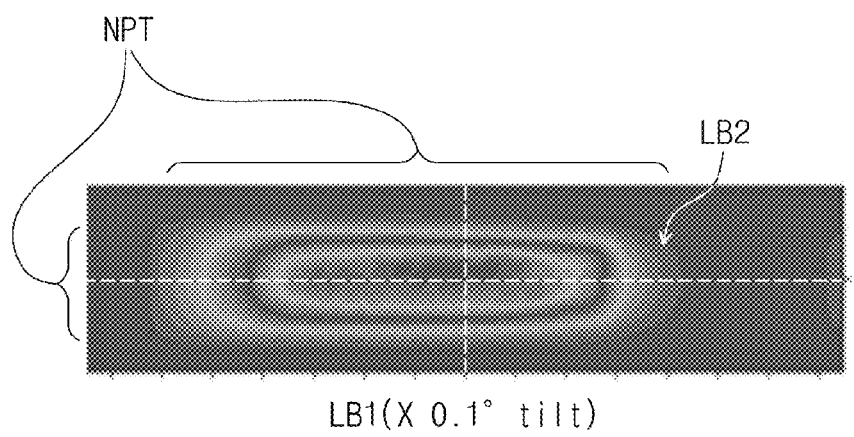
FIG. 8B is a view showing a test result of an irradiation area of a first laser beam generated by the laser beam generator shown in FIG. 5.

FIG. 8B is a view showing a test result of an irradiation area of the first laser beam generated by the laser beam generator shown in FIG. 5.

Figure 9:
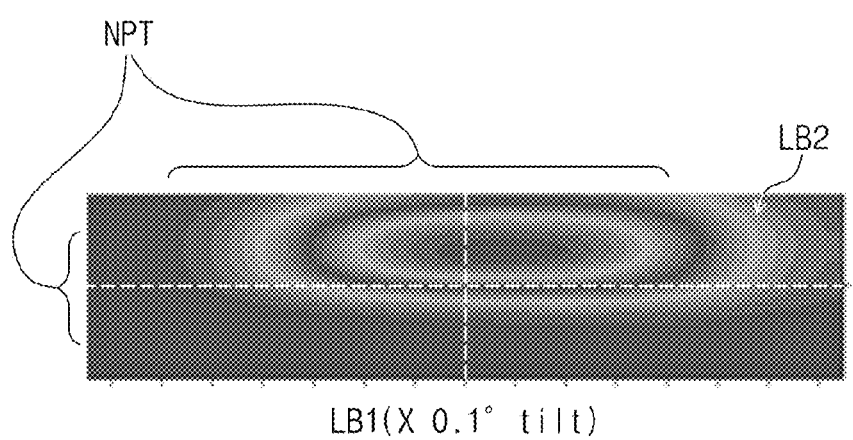
FIG. 9 is a view showing a test result of an irradiation area of a first laser beam generated by the laser beam generator shown in FIG. 6.

FIG. 9 is a view showing a test result of an irradiation area of the first laser beam generated by the laser beam generator shown in FIG. 6.

FIGS. 8A, 8B, and 9 are views showing luminance of the light incident surface of the beam splitter.

Referring to FIG. 8A, the incident angle of the first laser beam L1 may be about zero (0). For example, the incident angle of the first laser beam L1 may be the first angle θ1. The second laser beam L2 shown in FIG. 3 may be irradiated to or incident upon the normal irradiation portion NPT of the light incident surface LIS of the beam splitter B-HOM.

Referring to FIG. 8B, the first laser beam LB1 may travel at the first angle θ1 with respect to the X-axis direction X. For example, the incident angle of the first laser beam LB1 may be the first angle θ1. The second laser beam LB2 shown in FIG. 5 may be irradiated to the normal irradiation portion NPT of the light incident surface LIS of the beam splitter B-HOM. For example, the first angle θ1 that may be the incident angle of the first laser beam LB1 may be about 0.1° with respect to the X-axis direction X.

Referring to FIG. 9, the second laser beam LB2 shown in FIG. 6 may be partially deviated from the normal irradiation portion NPT of the light incident surface LIS of the beam splitter B-HOM. Although not shown in the figures, the second laser beam LB2 shown in FIG. 7 may also be partially deviated from the normal irradiation portion NPT of the light incident surface LIS of the beam splitter B-HOM.

Consequently, as shown in FIGS. 3 and 5, the second laser beam L2 and the second laser beam LB2 may be provided to or incident upon the normal irradiation portion NPT of the light incident surface LIS regardless of the irradiation direction of the first laser beams L1 and LB1.

Figure 10:
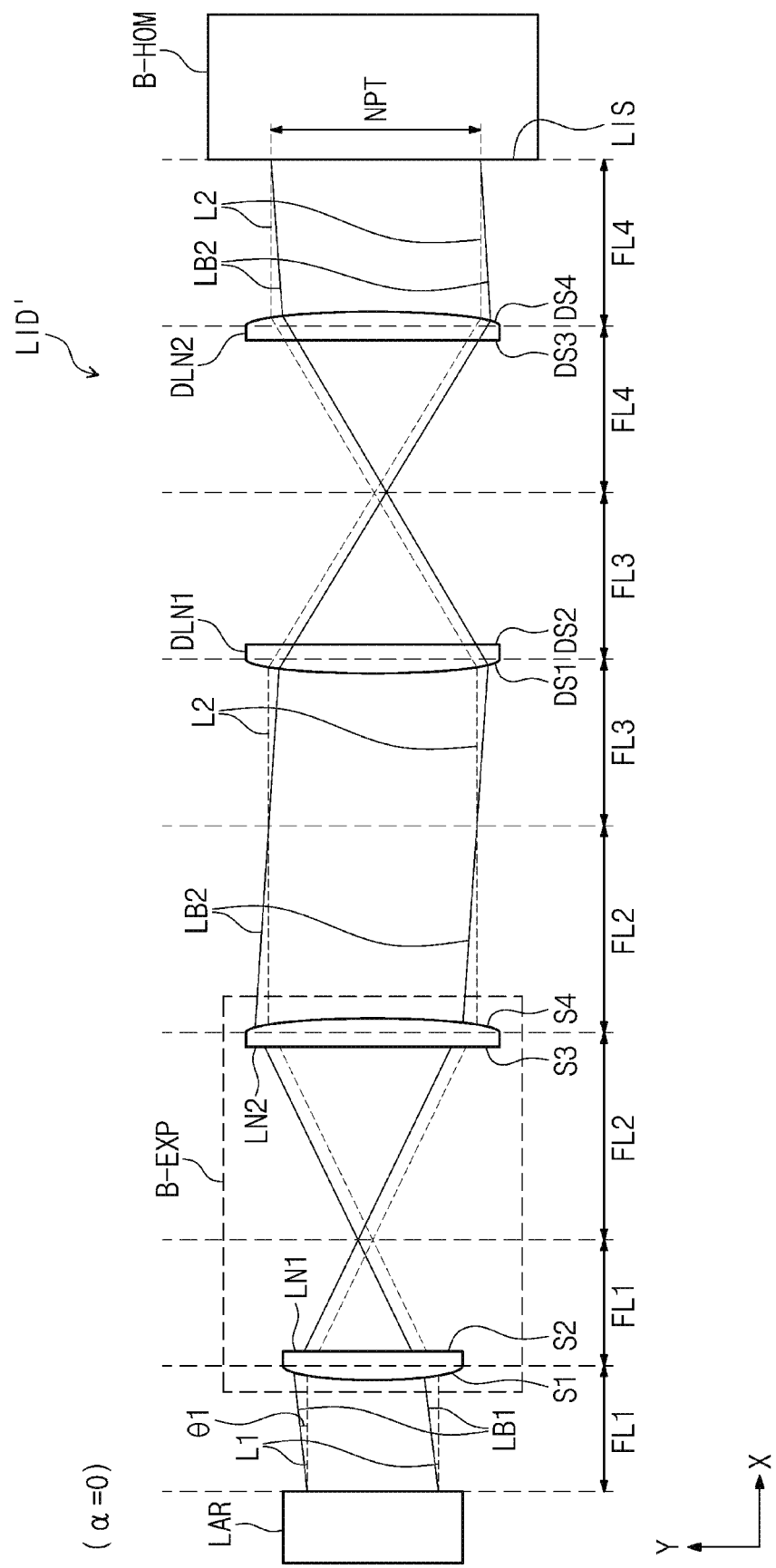
FIG. 10 is a view showing a configuration or arrangement of a laser irradiation apparatus according to an embodiment.

FIG. 10 is a view showing a laser irradiation apparatus LID' according to an embodiment.

The laser irradiation apparatus LID' according to an embodiment may have substantially the same configuration or arrangement as that of the laser irradiation apparatus LID shown in FIG. 3 except that first and second dummy lenses DLN1 and DLN2 may be further included. Accordingly, hereinafter, the first and second dummy lenses DLN1 and DLN2 will be described.

Referring to FIG. 10, the laser irradiation apparatus LID' may further include the first and second dummy lenses DLN1 and DLN2. The first dummy lens DLN1 and the second dummy lens DLN2 may be disposed between the beam expander B-EXP and the beam splitter B-HOM.

The first dummy lens DLN1 and the second dummy lens DLN2 may be arranged or disposed in the X-axis direction X together with the second lens LN2 and the beam splitter B-HOM. The first dummy lens DLN1 may be disposed to face the second lens LN2 in the X-axis direction X. The second dummy lens DLN2 may be disposed to face the first dummy lens DLN1 in the X-axis direction X. The first dummy lens DLN1 may be disposed between the second lens LN2 and the second dummy lens DLN2. The second dummy lens DLN2 may be disposed between the first dummy lens DLN1 and the beam splitter B-HOM.

The first dummy lens DLN1 may have a third focal length FL3. The second dummy lens DLN2 may have a fourth focal length FL4. The third focal length FL3 may be substantially the same as the second focal length FL2; however, it should not be limited thereto or thereby. For example, the third focal length FL3 may be different from the second focal length FL2. The fourth focal length FL4 may be substantially the same as the third focal length FL3; however, it should not be limited thereto or thereby. For example, the fourth focal length FL4 may be different from the third focal length FL3.

A distance between the second lens LN2 and the first dummy lens DLN1 may be set as a value obtained by adding the second focal length FL2 and the third focal length FL3 in the X-axis direction X.

A distance between the first dummy lens DLN1 and the second dummy lens DLN2 may be set as a value obtained by adding the third focal length FL3 and the fourth focal length FL4 in the X-axis direction X.

The beam splitter B-HOM may be spaced apart from the second dummy lens DLN2 by the fourth focal length FL4 in the X-axis direction X.

The first dummy lens DLN1 may include a first dummy surface DS1 facing the second lens LN2 and a second dummy surface DS2 facing the second dummy lens DLN2. The first dummy surface DS1 may be a convex surface toward the second lens LN2, and the second dummy surface DS2 may be a substantially flat surface substantially parallel to the Y-axis direction Y. For example, the first dummy lens DLN1 may be defined as a convex lens.

The second dummy lens DLN2 may include a third dummy surface DS3 facing the second dummy surface DS2 and a fourth dummy surface DS4 facing the beam splitter B-HOM. The fourth dummy surface DS4 may be a convex surface toward the beam splitter B-HOM, and the third dummy surface DS3 may be a substantially flat surface substantially parallel to the Y-axis direction Y. For example, the second dummy lens DLN2 may be defined as a convex lens.

The second dummy surface DS2 and the third dummy surface DS3, which face each other, may include substantially flat surfaces substantially parallel to each other. The first dummy surface DS1 and the fourth dummy surface DS4, which face opposite directions to each other, may include convex surfaces toward opposite directions to each other.

The first laser beam L1 may be provided to or incident upon the beam expander B-EXP and may be expanded, and the second laser beam L2 expanded by the beam expander B-EXP may be provided to or incident upon the first dummy lens DLN1. The second laser beam L2 may maintain the corrected width and may be provided to or incident upon the beam splitter B-HOM after passing through the first dummy lens DLN1 and the second dummy lens DLN2. The second laser beam L2 may be provided to or incident upon the normal irradiation portion NPT.

The first laser beam LB1 traveling at the first angle θ1 with respect to the X-axis may be expanded by the beam expander B-EXP, and the expanded second laser beam LB2 may be provided to or incident upon the first dummy lens DLN1. The second laser beam LB2 may be condensed and expanded by the first dummy lens DLN1 and may be provided to or incident upon the second dummy lens DLN2. The second laser beam LB2 may be refracted by the second dummy lens DLN2 and may be irradiated to or incident upon the light incident surface LIS of the beam splitter B-HOM.

In a case that the laser beam generator LAR is spaced apart from the first lens LN1 by the first focal length FL1, the first dummy lens DLN1 is spaced apart from second lens LN2 by the distance obtained by adding the second focal length FL2 and the third focal length FL3, the second dummy lens DLN2 is spaced apart from the first dummy lens DLN1 by the distance obtained by adding the third focal length FL3 and the fourth focal length FL4, and the beam splitter B-HOM is spaced apart from the second dummy lens DLN2 by the fourth focal length FL4, the second laser beam LB2 may be provided to or incident upon the normal irradiation portion NPT of the light incident surface LIS.

Figure 11:
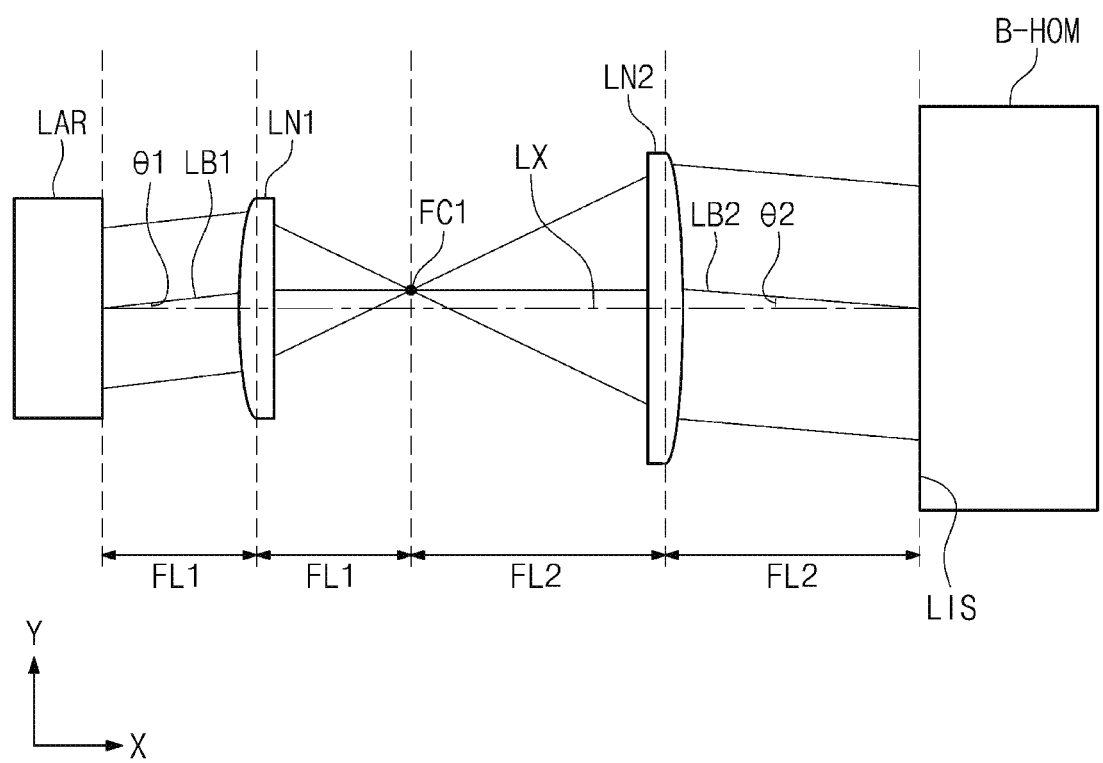
FIG. 11 is a view showing a relationship between an angle of a laser beam emitted from a laser beam generator and an angle of a laser beam incident to a beam splitter.

FIG. 11 is a view showing a relationship between an angle of the laser beam emitted from the laser beam generator and an angle of the laser beam incident to the beam splitter.

Referring to FIG. 11, the first laser beam LB1 may travel at a first angle θ1 with respect to the X-axis direction X or the optical axis LX. Accordingly, the incident angle of the first laser beam LB1 may be the first angle θ1. The first laser beam LB1 may pass through the first focus FC1 after passing through the first lens LN1. The first laser beam LB1 may be provided to or incident upon the second lens LN2 after passing through the first focus FC1.

The second laser beam LB2 may travel at the second angle θ2 with respect to the X-axis direction X after passing through the second lens LN2. Accordingly, an incident angle of the second laser beam LB2 toward the light incident surface LIS of the beam splitter B-HOM may be the second angle θ2.

A relationship between the first angle θ1 and the second angle θ2 may be defined by the following Equation 1.

$$FL1 \cdot \theta1 = FL2 \cdot \theta2 \qquad \text{Equation 1}$$

In Equation 1, FL1 denotes the first focal length FL1 of the first lens LN1, FL2 denotes the second focal length FL2 of the second lens LN2, θ1 denotes the incident angle of the first laser beam LB1, and θ2 denotes the incident angle of the second laser beam LB2.

The incident angle of the first laser beam LB1 and the incident angle of the second laser beam LB2 may be determined depending on the first focal length FL1 and the second focal length FL2. For example, as a ratio of the second focal length FL2 to the first focal length FL1 increases, the second angle θ2 may decrease. For example, as the second focal length FL2 increases, the incident angle of the second laser beam LB2 with respect to the X-axis direction X decreases. Thus, the second laser beam LB2 may travel more parallel to the X-axis direction X.

Figure 12:
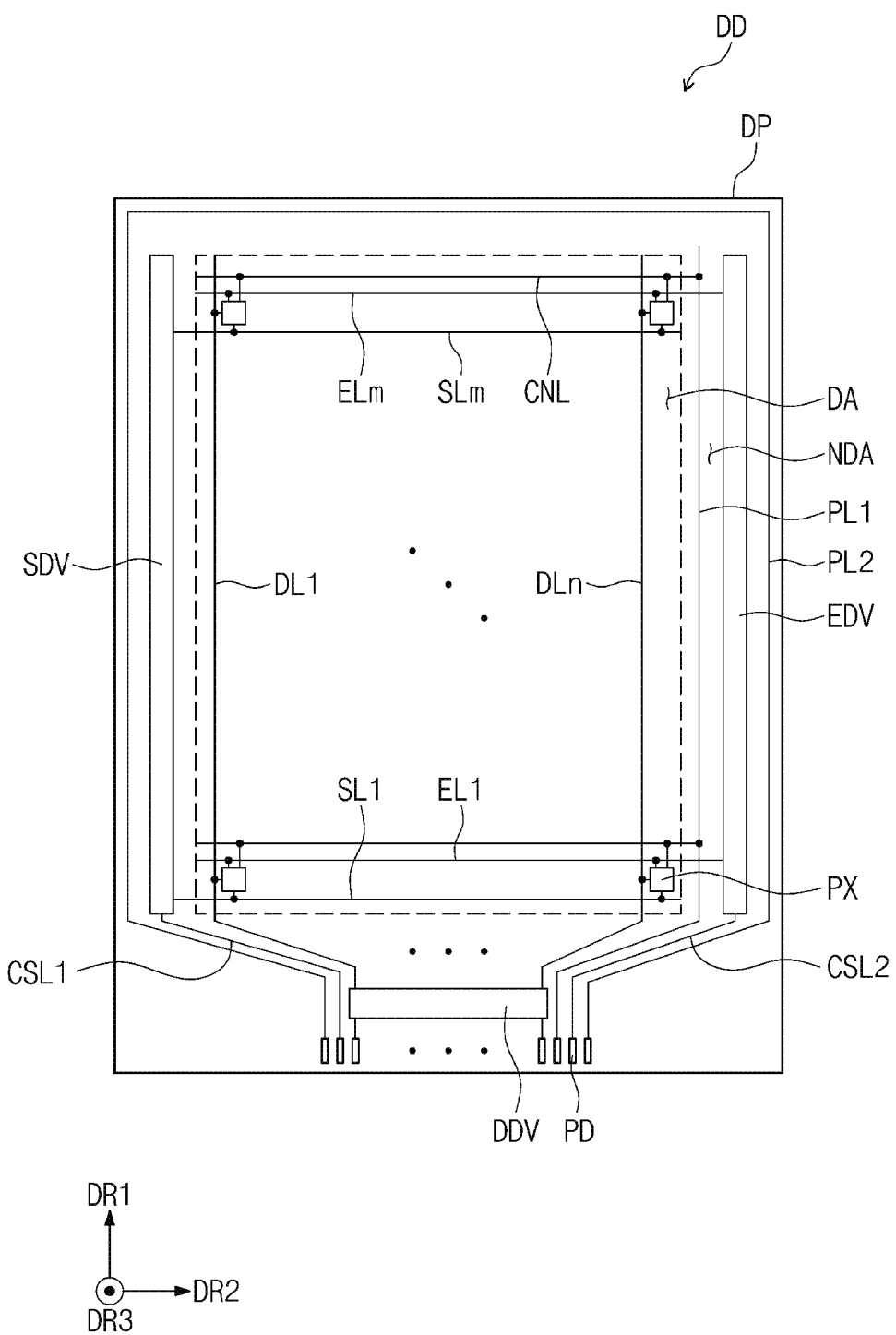
FIG. 12 is a plan view showing a display panel manufactured using a laser irradiation apparatus.

FIG. 12 is a plan view showing a display panel DP manufactured using the laser irradiation apparatus.

Referring to FIG. 12, a display device DD may include the display panel DP, a scan driver SDV, a data driver DDV, and an emission driver EDV.

The display panel DP may be a light-emitting type display panel, however, it should not be particularly limited. For instance, the display panel DP may be an organic light emitting display panel or a quantum dot light emitting display panel. A light emitting layer of the organic light emitting display panel may include an organic light emitting material. A light emitting layer of the quantum dot light emitting display panel may include a quantum dot or a quantum rod. Hereinafter, the organic light emitting display panel will be described as a representative example of the display panel DP.

The display panel DP may have a substantially rectangular shape having long sides extending in a first direction DR1 and short sides extending in a second direction DR2, however, the shape of the display panel DP should not be limited thereto or thereby. The display panel DP may include a display area DA and a non-display area NDA surrounding or adjacent to the display area DA.

The display panel DP may include a plurality of pixels PX, a plurality of scan lines SL1 to SLm, a plurality of data lines DL1 to DLn, a plurality of emission lines EL1 to ELm, first and second control lines CSL1 and CSL2, first and second power lines PL1 and PL2, connection lines CNL, and a plurality of pads PD. Each of "m" and "n" is a natural number.

The pixels PX may be arranged or disposed in the display area DA. The scan driver SDV, the emission driver EDV, and the data driver DDV may be disposed in the non-display area NDA. The scan driver SDV and the emission driver EDV may be disposed in the non-display area NDA to be respectively adjacent to the long sides of the display panel DP. The data driver DDV may be manufactured in the form of an integrated circuit chip and may be disposed to be in the non-display area NDA to be adjacent to one or a short side, for example, a lower end of the display panel DP, of the short sides of the display panel DP.

The scan lines SL1 to SLm may extend in the second direction DR2 and may be electrically connected to the pixels PX and the scan driver SDV. The data lines DL1 to DLn may extend in the first direction DR1 and may be electrically connected to the pixels PX and the data driver DDV. The emission lines EL1 to ELm may extend in the second direction DR2 and may be electrically connected to the pixels PX and the emission driver EDV.

The first power line PL1 may extend in the first direction DR1 and may be disposed in the non-display area NDA. The first power line PL1 may be disposed between the display area DA and the emission driver EDV. The connection lines CNL may be disposed in the display area DA, may extend in the second direction DR2, and may be arranged or disposed in the first direction DR1. The connection lines CNL may be electrically connected to the first power line PL1 and the pixels PX. A first voltage may be applied to the pixels PX through the first power line PL1 and the connection lines CNL electrically connected to the first power line PL1.

The second power line PL2 may be disposed in the non-display area NDA. The second power line PL2 may extend along the long sides of the display panel DP and the other short side at which the data driver DDV is not disposed in the display panel DP. The second power line PL2 may be disposed outside the scan driver SDV and the emission driver EDV. Although not shown in the figures, the second power line PL2 may extend to the display area DA and may be electrically connected to the pixels PX. A second voltage having a level lower than that of the first voltage may be applied to the pixels PX through the second power line PL2.

The first control line CSL1 may be electrically connected to the scan driver SDV and may extend toward the lower end of the display panel DP when viewed in a plan view. The second control line CSL2 may be electrically connected to the emission driver EDV and may extend toward the lower end of the display panel DP when viewed in a plan view. The data driver DDV may be disposed between the first control line CSL1 and the second control line CSL2.

The pads PD may be disposed closer to the lower end of the display panel DP than the data driver DDV is disposed. The data lines DL1 to DLn may be electrically connected to the data driver DDV, and the data driver DDV may be electrically connected to the pads PD corresponding to the data lines DL1 to DLn. The first power line PL1, the second power line PL2, the first control line CSL1, and the second control line CSL2 may be electrically connected to corresponding pads PD.

Although not shown in the figures, the display device DD may further include a timing controller to control an operation of the scan driver SDV, the data driver DDV, and the emission driver EDV and a voltage generator to generate the first and second voltages. The timing controller and the voltage generator may be electrically connected to corresponding pads PD through a printed circuit board.

The scan driver SDV may generate a plurality of scan signals, and the scan signals may be applied to the pixels PX through the scan lines SL1 to SLm. The data driver DDV may generate a plurality of data voltages, and the data voltages may be applied to the pixels PX through the data lines DL1 to DLn. The emission driver EDV may generate a plurality of emission signals, and the emission signals may be applied to the pixels PX through the emission lines EL1 to ELm.

The pixels PX may receive the data voltages in response to the scan signals. The pixels PX may emit a light having a luminance corresponding to the data voltages in response to the emission signals, and thus, the image may be displayed. An emission time of the pixels PX may be controlled by the emission signals.

Figure 13:
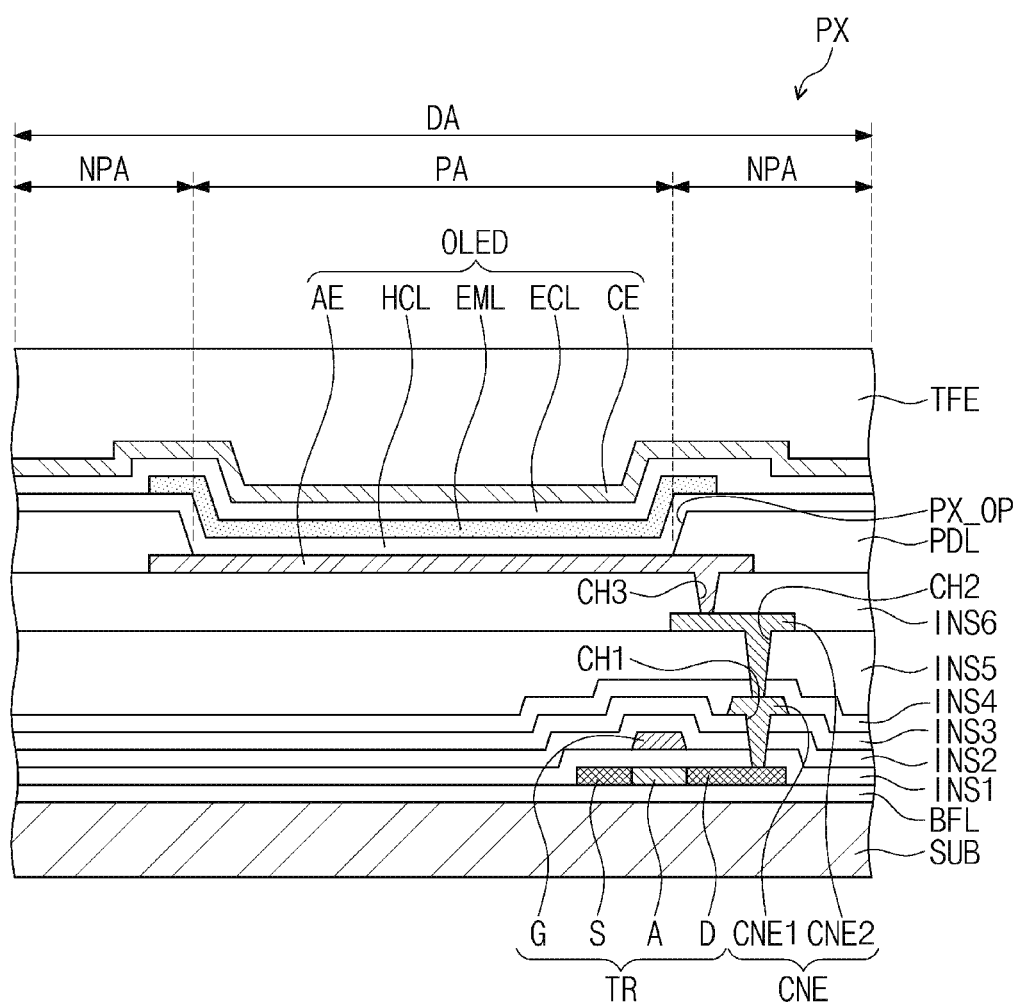
FIG. 13 is a schematic cross-sectional view showing one pixel among the pixels shown in FIG. 12.

FIG. 13 is a schematic cross-sectional view showing one pixel among the pixels shown in FIG. 12.

Referring to FIG. 13, the pixel PX may include a transistor TR and a light emitting element OLED. The light emitting element OLED may include a first electrode AE, a second electrode CE, a hole control layer HCL, an electron control layer ECL, and a light emitting layer EML. The first electrode AE may be an anode electrode, and the second electrode CE may be a cathode electrode.

The transistor TR and the light emitting element OLED may be disposed on the substrate SUB. As an example, one transistor TR is shown in FIG. 13, however, the pixel PX may include a plurality of transistors and at least one capacitor to drive the light emitting element OLED.

The display area DA may include an emission area PA corresponding to the pixel PX and a non-emission area NPA around the emission area PA. The light emitting element OLED may be disposed in the emission area PA.

A buffer layer BFL may be disposed on the substrate SUB, and the buffer layer BFL may be an inorganic layer. A semiconductor pattern may be disposed on the buffer layer BFL. The semiconductor pattern may be formed using the semiconductor layer. The semiconductor pattern may include polycrystalline silicon. The semiconductor pattern including the polycrystalline silicon may be formed on the substrate SUB by the laser irradiation apparatus LID.

The semiconductor pattern may be doped with an N-type dopant or a P-type dopant. The semiconductor pattern may have different electrical properties depending on whether it is doped with the P-type dopant or the N-type dopant. The semiconductor pattern may include a high-doped region and a low-doped region. The high-doped region may have a conductivity greater than that of the low-doped region and may substantially serve as a source electrode and a drain electrode of the transistor TR. The low-doped region may substantially correspond to an active (or channel) of the transistor TR.

A source S, an active area or region A, and a drain D of the transistor TR may be formed from the semiconductor pattern. A first insulating layer INS1 may be disposed on the semiconductor pattern. A gate G of the transistor TR may be disposed on the first insulating layer INS1. A second insulating layer INS2 may be disposed on the gate G. A third insulating layer INS3 may be disposed on the second insulating layer INS2.

A connection electrode CNE may be disposed between the transistor TR and the light emitting element OLED to electrically connect the transistor TR to the light emitting element OLED. The connection electrode CNE may include a first connection electrode CNE1 and a second connection electrode CNE2 may be disposed on the first connection electrode CNE1.

The first connection electrode CNE1 may be disposed on the third insulating layer INS3 and may be electrically connected to the drain D through a first contact hole CH1 defined or formed through the first, second, and third insulating layers INS1, INS2, and INS3. A fourth insulating layer INS4 may be disposed on the first connection electrode CNE1. A fifth insulating layer INS5 may be disposed on the fourth insulating layer INS4.

The second connection electrode CNE2 may be disposed on the fifth insulating layer INS5. The second connection electrode CNE2 may be electrically connected to the first connection electrode CNE1 through a second contact hole CH2 defined or formed through the fifth insulating layer INS5. A sixth insulating layer INS6 may be disposed on the second connection electrode CNE2. Each of the first to sixth insulating layers INS1 to INS6 may be an inorganic layer or an organic layer.

The first electrode AE may be disposed on the sixth insulating layer INS6. The first electrode AE may be electrically connected to the second connection electrode CNE2 through a third contact hole CH3 defined or formed through the sixth insulating layer INS6. A pixel definition layer PDL may be disposed on the first electrode AE and the sixth insulating layer INS6 to expose a predetermined portion of the first electrode AE. The pixel definition layer PDL may be provided with an opening PX_OP defined or formed therethrough to expose the portion of the first electrode AE.

The hole control layer HCL may be disposed on the first electrode AE and the pixel definition layer PDL. The hole control layer HCL may be commonly disposed in the emission area PA and the non-emission area NPA. The hole control layer HCL may include a hole transport layer and a hole injection layer.

The light emitting layer EML may be disposed on the hole control layer HCL. The light emitting layer EML may be disposed in an area corresponding to the opening PX_OP. The light emitting layer EML may include an organic material and/or an inorganic material. The light emitting layer EML may generate a light having one of red, green, and blue colors.

The electron control layer ECL may be disposed on the light emitting layer EML and the hole control layer HCL. The electron control layer ECL may be commonly disposed in the emission area PA and the non-emission area NPA. The electron control layer ECL may include an electron transport layer and an electron injection layer.

The second electrode CE may be disposed on the electron control layer ECL. The second electrode CE may be commonly disposed in the pixels PX. A thin film encapsulation layer TFE may be disposed on the light emitting element OLED.

The first voltage may be applied to the first electrode AE through the transistor TR, and the second voltage may be applied to the second electrode CE. Holes and electrons injected into the light emitting layer EML may be recombined to generate excitons, and the light emitting element OLED may emit the light by the excitons that return to a ground state from an excited state.

Although embodiments have been described, it is understood that the disclosure should not be limited to these embodiments but various changes and modifications can be made by one of ordinary skill in the art within the spirit and scope of the disclosure as hereinafter claimed. Therefore, the disclosed subject matter should not be limited to any single embodiment described herein, and the scope of the disclosure shall be determined according to the attached claims.

What is claimed is:

1. A laser irradiation apparatus comprising:
a laser beam generator that generates a first laser beam;
a beam expander that expands the first laser beam and outputs the expanded first laser beam as a second laser beam;
a beam splitter that splits the second laser beam into third laser beams and outputs the third laser beams; and
a beam condenser that condenses the third laser beams and outputs condensed third laser beams, wherein
the beam expander comprises:
a first lens having a first focal length; and
a second lens having a second focal length, wherein
the first lens is disposed between the laser beam generator and the second lens,
the second lens is disposed between the first lens and the beam splitter,
the laser beam generator is spaced apart from the first lens by the first focal length,
the beam splitter is spaced apart from the second lens by the second focal length, and
a location of a focus of the first lens is directly between the first lens and the second lens.

2. The laser irradiation apparatus of claim 1, wherein the first laser beam is incident upon the second lens through the first lens, expanded by the first lens and the second lens, and output by the second lens as the second laser beam.

3. The laser irradiation apparatus of claim 1, wherein the laser beam generator, the beam expander, the beam splitter, and the beam condenser are disposed along an X-axis direction parallel to an optical axis of the first lens and the second lens.

4. The laser irradiation apparatus of claim 3, wherein the second focal length of the second lens is greater than the first focal length of the first lens in the X-axis direction.

5. The laser irradiation apparatus of claim 3, wherein the second laser beam has a width greater than a width of the first laser beam in a Y-axis direction perpendicular to the X-axis direction.

6. The laser irradiation apparatus of claim 5, wherein the second lens has a width greater than a width of the first lens in the Y-axis direction.

7. The laser irradiation apparatus of claim 3, wherein a distance between the first lens and the second lens is defined set by a value obtained by adding the first focal length, the second focal length, and a first distance in the X-axis direction.

8. The laser irradiation apparatus of claim 7, wherein the first distance is equal to or greater than about zero.

9. The laser irradiation apparatus of claim 8, wherein the first distance is set based on an emission angle at which the first laser beam output from the laser beam generator is emitted with respect to the X-axis direction.

10. The laser irradiation apparatus of claim 9, wherein the first distance increases as the emission angle increases.

11. The laser irradiation apparatus of claim 3, wherein
the first lens comprises:
a first surface facing the laser beam generator; and
a second surface facing the second lens,
the second lens comprises:
a third surface facing the second surface of the first lens; and
a fourth surface facing the beam splitter,
one of the first surface and the second surface comprises a flat surface or a curved surface,
the other of the first surface and the second surface comprises the curved surface,
one of the third surface and the fourth surface comprises a flat surface or a curved surface, and
the other of the third surface and the fourth surface comprises the curved surface.

12. The laser irradiation apparatus of claim 11, wherein
the beam splitter comprises:
a plurality of third lenses facing the second lens; and
a plurality of fourth lenses disposed between the plurality of third lenses and the beam condenser,
the plurality of third lenses comprise:
fifth surfaces facing the second lens; and
a sixth surface facing the plurality of fourth lenses,
the plurality of fourth lenses comprise:
a seventh surface facing the plurality of third lenses; and
eighth surfaces facing the beam condenser,
one of the sixth surface and the fifth surfaces comprises a flat surface or a curved surface,
the other of the sixth surface and the fifth surfaces comprises the curved surface,
one of the seventh surface and the eighth surfaces comprises a flat surface or a curved surface, and
the other of the seventh surface and the eighth surfaces comprises the curved surface.

13. The laser irradiation apparatus of claim 12, wherein
the beam condenser comprises:
a ninth surface facing the plurality of fourth lenses; and
a tenth surface opposite to the ninth surface,
one of the ninth surface and the tenth surface comprises a flat surface or a curved surface, and
the other of the ninth surface and the tenth surface comprises the curved surface.

14. A laser irradiation apparatus comprising:
a laser beam generator that generates a first laser beam;
a beam expander that expands the first laser beam and outputs the expanded first laser beam as a second laser beam;
a beam splitter that splits the second laser beam into third laser beams and outputs the third laser beams; and
a beam condenser that condenses the third laser beams and outputs condensed third laser beams, wherein
the beam expander comprises:
a first lens having a first focal length; and
a second lens having a second focal length greater than the first focal length of the first lens, wherein
the first lens is disposed between the laser beam generator and the second lens,
the second lens is disposed between the first lens and the beam splitter,
the laser beam generator is spaced apart from the first lens by the first focal length, and
the laser beam splitter is spaced apart from the second lens by the second focal length.

* * * * *